(12) United States Patent
Tso et al.

(10) Patent No.: US 8,967,509 B2
(45) Date of Patent: Mar. 3, 2015

(54) TORQUE-CUSTOMIZED SHREDDER LOAD CALIBRATION

(75) Inventors: Yung Kang Tso, Shanghai (CN); Guanlong Chen, Shanghai (CN)

(73) Assignee: Aurora Office Equipment Co., Ltd. Shanghai (CN)

( * ) Notice: Subject to any disclaimer, the term of this patent is extended or adjusted under 35 U.S.C. 154(b) by 464 days.

(21) Appl. No.: 13/506,586

(22) Filed: Apr. 30, 2012

(65) Prior Publication Data

US 2013/0134241 A1    May 30, 2013

(30) Foreign Application Priority Data

Nov. 24, 2011 (CN) .......................... 2011 1 0378393

(51) Int. Cl.
*B02C 23/00* (2006.01)
(52) U.S. Cl.
USPC ........................................... 241/35; 241/100
(58) Field of Classification Search
USPC ................ 241/100, 236, 295, 35–36
See application file for complete search history.

(56) References Cited

U.S. PATENT DOCUMENTS

| 8,091,809 | B2 * | 1/2012 | Hu et al. ......................... 241/30 |
| 8,382,019 | B2 * | 2/2013 | Romanovich et al. .......... 241/36 |
| 2010/0243774 | A1 * | 9/2010 | Hu et al. ......................... 241/30 |
| 2010/0327091 | A1 * | 12/2010 | Ko .................................. 241/25 |
| 2011/0266379 | A1 * | 11/2011 | Romanovich et al. .......... 241/30 |

\* cited by examiner

*Primary Examiner* — Faye Francis
(74) *Attorney, Agent, or Firm* — WHGC, P.L.C.; John F. O'Rourke

(57) ABSTRACT

Paper shredder thickness calibration using a Hall effect torque detector coupled to a paper shredder motor, producing a signal corresponding to the paper shredder motor rotation, a controller receives the signal and determines a paper shredder motor torque from the signal corresponding to the rotation of the paper shredder motor, with the torque corresponding to shreddant thickness. Signal is compared to predetermined maximum signal beyond which overload is signaled.
Also, a method of operating a paper shredder having a rotating motor to comminute shreddant, including providing a Hall effect rotor and sensor; creating a torque signal based on a full load motor torque, and comparing the current torque signal to the full load torque signal.

5 Claims, 5 Drawing Sheets

TORQUE-CUSTOMIZED SHREDDER LOAD CALIBRATION

BACKGROUND

1. Field of the Invention

The present invention relates to paper shredders and, in particular, to paper shredder thickness detectors.

2. Background Art

Unintended misuse of a paper shredder most often can be caused by feeding too many sheets of paper into the shredder paper feed mechanism at a time. Such misuse is a significant root cause for paper shredder malfunctions. Although a paper shredder may specify a maximum page count and paper weight for shredding, most users tend to feed the shredder using a "feel and experience" that can lead to overload due to paper thickness (weight) variances, misjudgment in the amount of shreddant inserted into the paper feed inlet, or inexperience with the paper shredder. As a result, feeding a bolus of shreddant that has too many sheets, that is too heavy (e.g., paper weight/thickness), or both leads to paper jam, causing the shredder to stop.

Paper jams exert unnecessary torque onto the shredder electric motor, gear drives, and cutting mechanism, leading to premature wear and failure of such parts. Excessive torque can arise from too many plies of shreddant being forced into the paper shredder feed opening at one time. Also, over time, the cutting mechanism of the shredder tends to wear and to lose capacity for shreddant. In general, as a shredder gets older and with wear, the maximum shredder capacity is reduced.

Current built-in devices that measure or detect shreddant thickness do not compensate for dulling of the shredder blades, accumulated misalignments, and general wear on the shredder mechanism over time. Often small blade misalignment errors may grow over time and may contribute to additional torque, wear and malfunctions. Paper shredders outfitted with auto-reverse functions also can suffer from misuse and misalignment. Meshing of cutting parts may become inefficient in this mode of operation and may further harm the shredding mechanism with excessive torque. A better thickness detector can assist in reducing shredder machine wear and malfunction.

SUMMARY

Embodiments of the present invention include a paper shredder, a method for operating the paper shredder and a paper shredder thickness detector. In an embodiment a paper shredder for comminuting a shreddant, includes a paper shredder motor having a rotatable motor shaft; a paper shredder controller, coupled to the paper shredder motor; a Hall effect rotor coupled to the paper shredder motor shaft and the paper shredder controller; and a Hall effect sensor magnetically coupled to the Hall effect rotor. The Hall effect sensor and Hall effect rotor are constituents of a Hall effect detector. Rotation of the rotatable motor shaft causes shreddant comminution, and the Hall effect detector detects a rotation speed of the rotatable motor shaft. A change in rotation speed from a first rotation speed to a second rotation speed is indicative of a torque corresponding to a thickness of shreddant being comminuted.

In embodiments, the change in rotation speed causes the Hall effect detector to transmit a signal to the paper shredder controller indicative of the thickness of shreddant being comminuted. In other embodiments, the shredder further includes an intermediate shielding body interposed between the paper shredder motor and the Hall effect detector, wherein electromagnetic interference to the Hall effect detector is reduced. The intermediate shielding body can be a ferrous material, such as a ferrous gear interposed between the motor and the Hall detector. The intermediate electromagnetic interference shielding body also can be a magnetic alloy. In yet other embodiments, the intermediate electromagnetic interference shielding body can be an offset space between the longitudinal axis of the shredder motor and the Hall effect rotor. The shredder also can include an annunciator, wherein when thickness of shreddant being comminuted exceeds a predetermined magnitude, the shredder controller is caused to create a perceptible indication of the exceeding a predetermined magnitude on the annunciator.

Method embodiments of operating a paper shredder having a rotating motor to comminute shreddant, can include providing a Hall effect rotor portion; providing a Hall effect sensor portion; magnetically coupling the Hall effect rotor portion to the Hall effect sensor portion, creating a Hall effect detector; determining a speed difference in motor rotation by the Hall effect detector; determining a torque difference from the speed difference, in which the torque difference corresponds to a thickness of the shreddant. Method embodiments also include operating the rotating motor wherein the thickness is at or below a predetermined thickness, as well as stopping the rotating motor when the thickness is above a predetermined thickness. In some embodiments, the method can include actuating an annunciator when the thickness is above a predetermined thickness. The annunciator is actuated by the shredder controller to produce a visible indication or an audible indication, or both. The method also can include setting a setpoint for the predetermined thickness.

Embodiments of a paper shredder thickness detector include a Hall effect detector coupled to the paper shredder motor and produces a signal corresponding to a rotation of the paper shredder motor; and a controller that receives the signal and determines a paper shredder motor torque from the signal corresponding to the rotation of the paper shredder motor. The paper shredder motor torque corresponds to a thickness of a shreddant being made to comminute by the rotation of the paper shredder motor. The Hall effect detector can have a Hall effect rotor; and a Hall effect detector magnetically coupled to the Hall effect rotor. An intermediate electromagnetic interference body can be interposed between the paper shredder motor and the Hall effect detector. The intermediate electromagnetic interference body comprises a ferrous material, a magnetic alloy material, or an offset space between the longitudinal axis of the paper shredder motor and the Hall effect detector.

BRIEF DESCRIPTION OF THE DRAWINGS

The invention is generally shown by way of reference to the accompanying drawings in which.

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

DETAILED DESCRIPTION OF THE EMBODIMENTS

The embodiments herein provide a torque-based thickness detector. As used herein, a torque change can be a surrogate for the thickness of the shreddant bolus in a paper feed opening (not shown) of the shredder. "Thickness" as it is sensed can be a function of individual sheet thickness, sheet composition, the number of sheets, and other physical factors related to the paper. During operation, the torque associated with "thickness" tends to correspond to the rotational speed of the shredder motor. Discussion of FIGS. 1, 2, and 3 will include reference to each other, where indicated.

Figure 1:
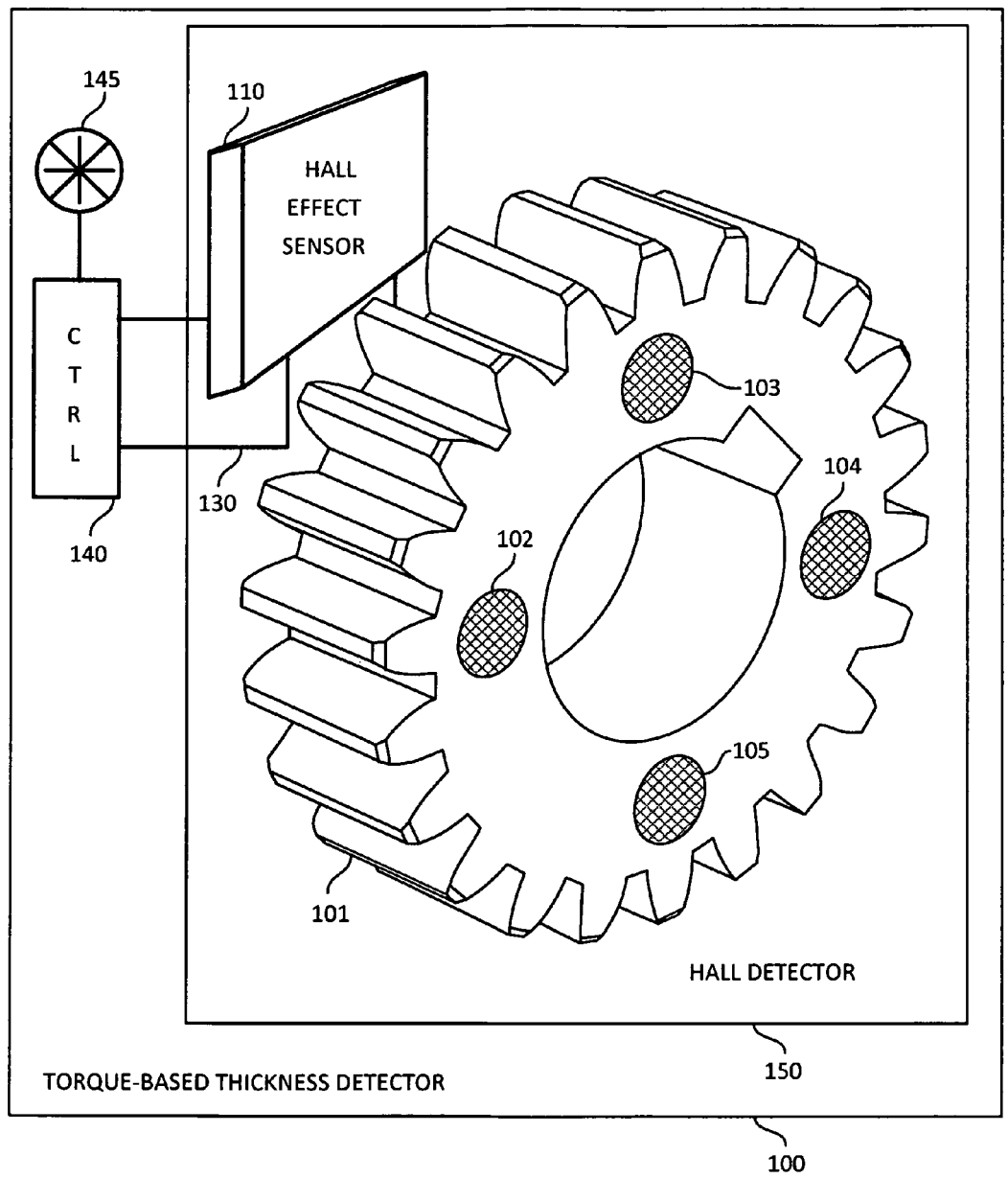
FIG. 1 is a simplified block drawing of a Hall effect torque detector, in accordance with the teachings of the present invention.

FIG. 1 is a perspective view illustration of a torque-based paper shredder thickness detector 100. A Hall-effect detector (HED) 150 is used to detect shredder motor torque. As used herein, an HED includes a rotor (gear-type rotor) 101 with magnetic elements 102, 103, 104, 105 in the rotor, or gear, and a Hall effect sensor (HES) 110. Together, the Hall effect rotor (gear 101) and Hall effect sensor 110 act as an HED 150. Rotor 101 ultimately is driven by the shredder motor, and rotates in proportion to the motor shaft rotational rate. The HES 110 senses movement of the magnetic elements 102-105 in the rotor 101 and generates signal 130 corresponding to the rotor speed. As the magnetic elements 102-105 pass by HES 110 more quickly, an increasing speed is indicated. Conversely, as the magnetic elements 102-105 begin to slow while passing by HES 110, a decreasing speed is indicated. As presently used, either an operating motor speed or a change in motor speed may reflect a torque or change in torque, so that an HED 150 may be used to measure torque. The operation of a gear-type/rotor Hall effect detector is well known in the arts. and an example of a gear-tooth (rotor) sensor) can be obtained from the AKL series of GT Sensors™, Digital Output Gear Tooth And Encoder Sensors, from NVE Corporation, Eden Prairie, Minn., USA, although others may be used. Signal 130 is received by shredder controller 140, which can cause the motor coupled to gear 101 to stop when an overload condition is detected, and overload annunciator 145 may be activated.

Figure 2:
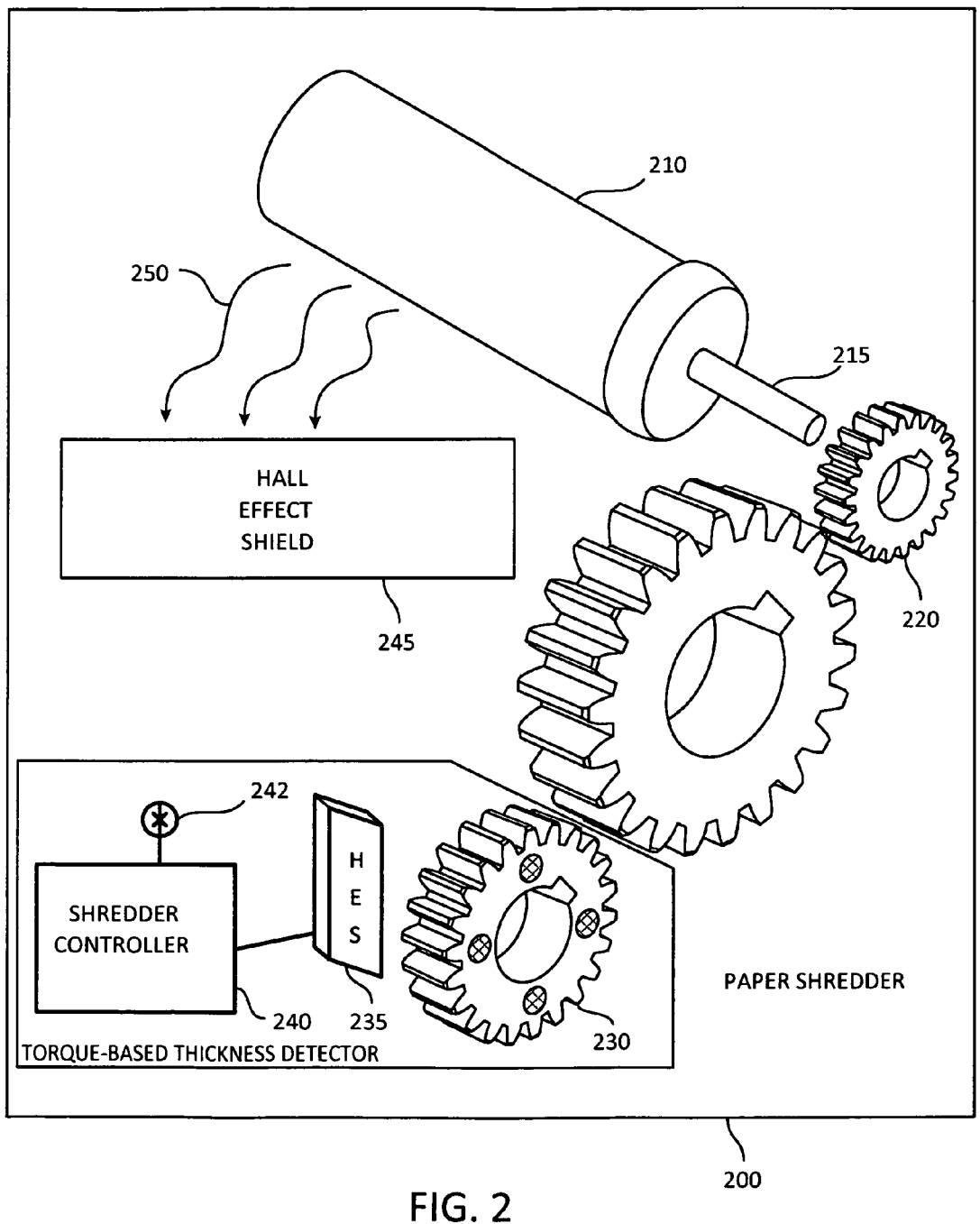
FIG. 2 is a simplified exploded drawing of a paper shredder having a torque-based thickness detector, in accordance with the present invention.
Figure 3:
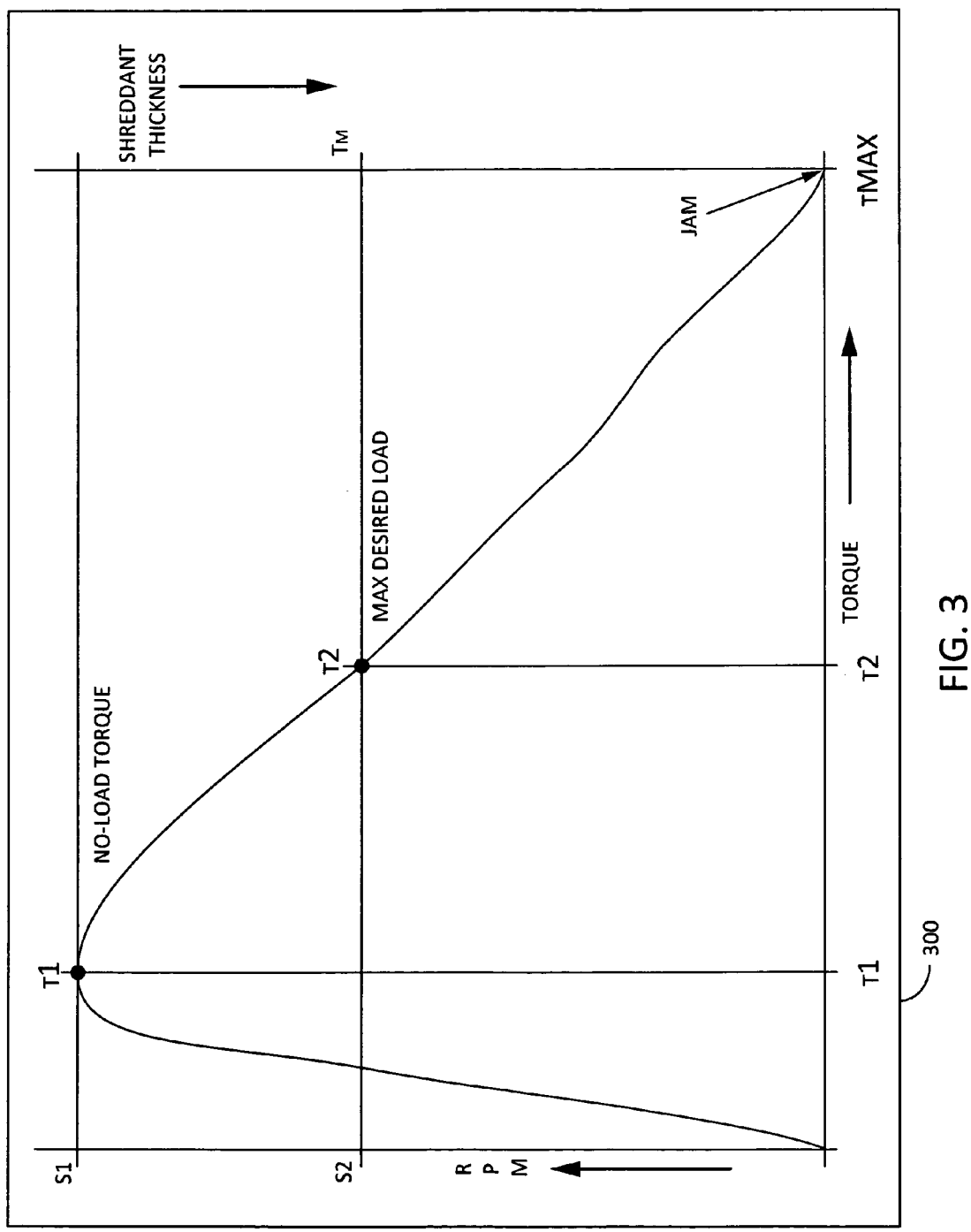
FIG. 3 is an example of a torque-motor speed relationship in accordance with the teachings of the present invention.

In the context of FIGS. 2 and 3, a motor RPM range can be assigned empirically to each increment representing a predetermined thickness of shreddant, with increasing thickness corresponding with increasing torque being applied to the shredder motor by each incremental thickness of shreddant. In general, motor 210 generates a level of torque τ1 under no-load conditions (no shreddant) associated with a no-load speed (S1). With additional thickness of shreddant, additional torque is applied to gear 230 by the shredder motor 210, and the shredder motor 210 and gear 230 decrease, relative to the no-load speed. In effect, a change in speed from a first speed to a second speed is indicative of a change from a first torque to a second torque, which, in turn, is indicative of shreddant thickness supplied to the paper shredder for comminution.

At a maximum desired thickness, $T_M$, the torque stress on the shredder motor 210, as determined by the rotational speed of gear 230 at the Hall effect sensor 235, can be identified by controller 240 and indicated by annunciator 242, for example, if thickness exceeds a setpoint of a predetermined magnitude. Annunciator 242 can provide a perceptible indication of a condition sensed by, a torque based detector, for example, shreddant exceeding a predetermined thickness, which can be an "overfeed" annunciator 242, to alert a user visually, audibly, or both. An excess detected torque due to a thickness exceeding a predetermined magnitude also may cause controller 240 to stop operation of motor 210.

In some environments, the Hall effect sensor may produce unstable results because of electromagnetic interference (EMI) 250 from the varying electrical fields of the shredder motor. Such interference may be ameliorated or greatly reduced by the use of an intermediate shielding body 245, which may be a ferrous metal, such as a reduction gear, or magnetic alloy shield, interposed of Hall effect detector 205 and motor 210. In addition, the influence of EMI 250 can be lessened by moving the Hall effect detector 205 away from the EMI source, namely, the shredder motor. To that end, gear 230 may be offset relative to coaxial positioning with the motor shaft, creating an offset space. Also, the physical composition of gear 230 may be a non-ferrous material to enhance the Hall sensor rotor (e.g., elements 102-105 in FIG. 1) interaction with the Hall effect sensor 235.

A non-limiting example of an intermediate shielding body 245 can be the body of an intermediate metal gear or a magnetic alloy shield, disposed between the HED (230, 235) and the paper shredder motor 210. Therefore, placement of the HED (230, 235) relative to electromagnetic interference (EMI) 250 source, for example, the shredder motor 210, or a physical EMI barrier 245 or both may be used as "shielding" for an HED. That is, both physical and spatial shielding may be used to reduce the effects of EMI 250.

FIG. 2 depicts a simple exploded perspective illustration of paper shredder having a torque-based thickness detector. In general, a paper shredder has a motor 210 that turns a motor shaft 215 in a direction which imparts rotational energy to driver gear 220. Driver gear 220 may turn several intermediate gears, such as reduction gear 225. Reduction gear 225 applies rotational energy to sensor gear (i.e. HED rotor) 230, which include magnetic elements, such as 232 therein. Element 232 can be similar to elements 102-105. The rotational energy from motor 215 can be reflected by rotation of sensor gear 230, for example, as measured in revolutions-per-minute (RPM). The rotation of sensor gear can be detected by Hall effect sensor 235, which transmits a signal representing RPM to shredder controller 240. Under no-load conditions upon the paper shredder blades, motor 210 turns at its highest speed.

Also in the context if FIG. 3, motor torque bears a direct relationship 300 to the thickness of shreddant being shredded, and an inverse relationship 300 to RPM of motor 210. With additional shreddant added to the thickness of the shreddant under comminution, motor 210 speed drops accordingly. A "jam" can occur when so much shreddant has been introduced into the shredder paper feed opening at once, that the blades stop turning, despite the maximum torque (τMAX) being applied by motor 210. "Overload" is said to occur when the thickness of the shreddant (e.g., sheets of ordinary paper) exceeds the maximum thickness deemed acceptable by the manufacturer. When Hall effect sensor 235 detects an RPM corresponding to an "overload" condition, the resulting signal transmitted to shredder controller 240 causes controller 240 to take a predetermined action. In certain embodiments, controller 240 can cause an annunciator 242 to indicate the overload condition.

In other embodiments, controller 240 can turn off power and bring to a stop motor 210. In this example, paper shredder 200 uses both distance (coaxial offset) and a physical shield 245 to reduce EMI 250. Shredder 200 can include a physical Hall effect shield 250, so called because its composition and placement can be deleterious to radiating EMI 250, thereby acting as a shield for rotor 230 and Hall effect sensor 235. Also, rotor 230 and Hall effect sensor 235 can be positioned to be offset from the rotational axis of motor 210, rotor 215, and driver gear 220. A conductive polymer also may be used.

Turning to FIG. 3, a relationship 300 between motor RPM and motor torque is depicted. In this relationship 300, there is a correspondence between shredder motor speed and shreddant thickness. With no paper being fed to the shredder blades, the rotational speed can rise to a maximum number of revolutions per minute. In general, at no-load torque level, the motor RPM can be at a peak (S1) corresponding to a first torque magnitude ($\tau 1$). As shredder load increases, motor RPM tends to decrease and, at an extreme, the motor RPM approaches zero and the shredder is considered to be jammed. At a empirically determined thickness, increasing torque upon the rotatable shaft by the shredder motor is reflected by a decrease in motor RPM (S2) at a second torque magnitude ($\tau 2$). Motor RPM may be measured by use of a HED coupled to the power transmission gearing disposed between the shredder motor and the shredder blades. Hall sensor are well-known as devices that measure rotational motor speed. The difference between the speeds (S2–S1) or the torques ($\tau 2$–$\tau 1$) correspond to the effort exerted by the motor to comminute a predetermined thickness of shreddant. In the case of FIG. 3, the torque difference ($\tau 2$–$\tau 1$) or speed difference (S2–S1) corresponds to a maximum acceptable thickness, $T_M$, as determined, for example, through empirical testing by the manufacturer. At or below the predetermined thickness (speed, or torque), operation of the shredder may continual as normal. Thickness $T_M$ can be implemented as a setpoint above which shredder controller (120, 240) causes the shredder to undertake a predetermined response corresponding to the overloading state of the paper shredder feed opening. A non-limiting example of a predetermined response can be initiation of an audible or visual indicator, or both, as signaled by an annunciator (125), which remains on until a shredder overload condition is cleared by a paper shredder user. Another non-limiting example of a predetermined response can be stopping the motor. Yet another non-limiting example of a predetermined response can be briefly reversing the direction of rotation, to assist removing overload and stopping the motor.

Figure 4:
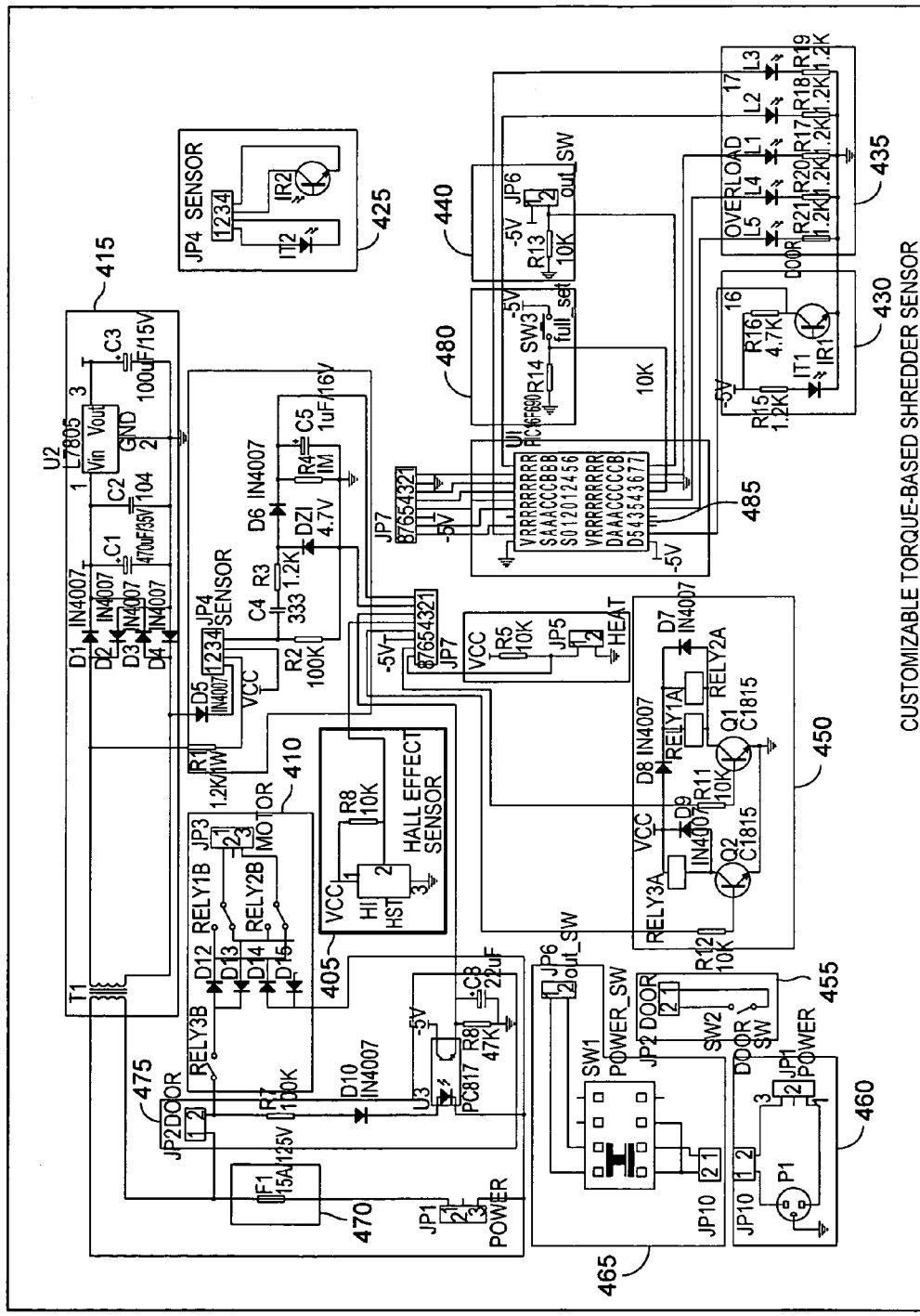
FIG. 4 is an example of a shredder controller schematic in accordance with the present invention.

An example customizable torque-based sensor and shredder electronics schematic 400 can be seen in FIG. 4. Hall-effect torque-based sensor 405 acts to detect motor speed. Accordingly, a decrease in motor speed between a no-load input level and a full-load input level may lead to a torque-based signal that can be used for calibration. Other circuits depicted in FIG. 4 include, for example, forward/reverse rotation control switch 410, circuit board power source 415, paper-full detection circuit 420, paper-full probe 425, paper inlet probe 430, 5 LED indicator lights 435, manual reverse rotation signal 440, electric relay propulsion circuit 450, paper tray door switch 455, motor power source connection wire 460, power source switch 465, safety fuse 470, paper tray door detection circuit 475, switch for setting paper full-thickness 480, and microcontroller 485. A suitable microcontroller can be a PIC16F690, a 20-Pin Flash-Based, 8-Bit CMOS Microcontrollers with nanoWatt Technology produced by Microchip Technology Inc., Chandler, Ariz., USA.

Nominal operational torque settings can vary machine-by-machine, a factor that may be overlooked in manufacturing. Over time, certain groups of shredder blades may tend to a first operative torque norm, another group of shredder blades may tend to a second operative torque norm, and so on. These differences in torque norms may vary according to the assembly batch of shredder blades being employed, the nature of the shreddant being comminuted, the batch of shredder motors being used at that time, the physical constituency of the drive train (all metal gears, part metal-part plastic gears, or all plastic gears), and most of all, multiple factors over time time. Torque value variations over time can be approximately predicted, so that an initial calibration for each machine during assembly can reduce the degree of torque miscalibration that a respective shredded may experience over its lifetime. This may lead to more efficient operation, longer shredder system life, and increased customer satisfaction with a torque-customized-shredder systems.

Shredders employing the aforementioned torque-based thickness detector may be used to take advantage of a torque-customized shredder calibration and may yield the previously noted features of longer operating life, greater operational efficiencies, and a higher degree of customer satisfaction.

One implementation of a torque-based shredder 400 which can be amenable to torque-customized shredder calibration can be depicted in FIG. 4.

Figure 5:
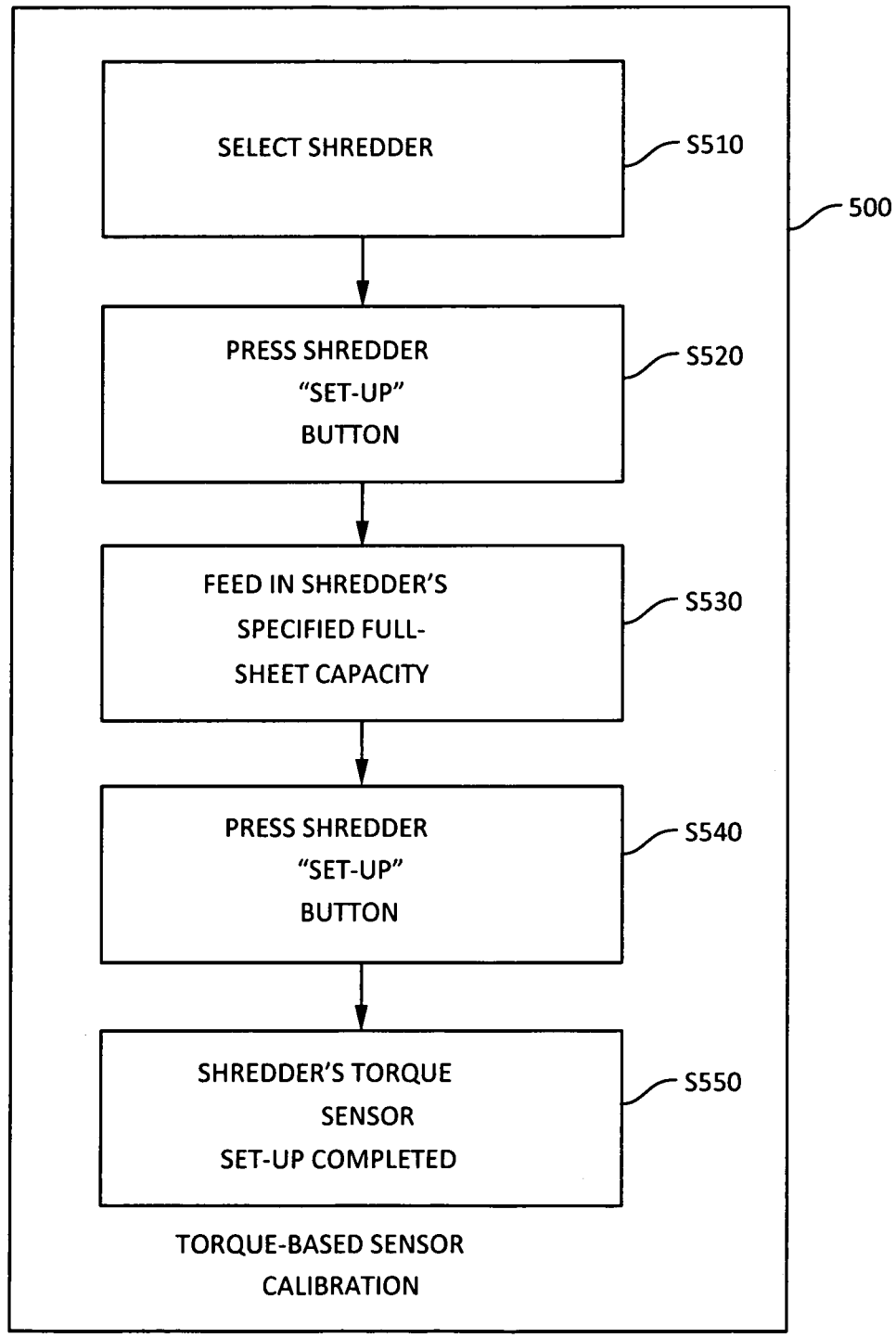
FIG. 5 is an example of a torque-based calibration method in accordance with the invention herein.

One example of a torque-based custom calibration method 500 is illustrated in FIG. 5. After selecting S510 the shredder to have torque-based calibration, and a first engaging S520, the "set-up button" (element 485 in FIG. 4), the method continues by feeding (S530) in the shredder's specified full-sheet capacity. Such feeding (S530) can cause the motor to slow down to accommodate the decreased rotation and increased torque of the motor under a specified load, which can be indicative of full load capacity of the shredder. While full-load feeding is in progress, calibration can be effected by a second engaging (S540) of the "set-up button" (element 485 in FIG. 4), to establish the maximum torque load. Storing (S550) this load value, for example, in the microcontroller (element 485 in FIG. 4) completes the shredder torque sensor setup.

When a shredder exceeds the load represented by the value stored at (S550), it can enter an overload routine, for example, shutting down the shredder motor, and indicating overload with an annunciator, which may be audible or visible, or both audible and visible.

Although the present invention has been described by way of example with references to the circuit drawings, it is to be noted herein that various changes and modifications will be apparent to those skilled in the art. Therefore, unless such changes and modifications depart from the scope of the present invention, they should be construed as being included therein.

The invention claimed is:

1. A paper shredder for comminuting a shreddant, comprising:
a paper shredder motor having a rotatable motor shaft;
a paper shredder controller, coupled to the paper shredder motor;
a magnetized rotor coupled to the paper shredder motor shaft and the paper shredder controller;
a hall effect detector magnetically coupled to the rotor to measure paper shredder motor torque; and
a memory capable of storing a preset motor torque value, wherein the preset motor torque value is indicative of an operational torque limit.

2. The paper shredder of claim 1, wherein the change in rotation speed of the rotor causes the Hall effect detector to transmit a signal to the paper shredder controller indicative of the thickness of shreddant being comminuted.

3. The paper shredder of claim 1, further comprising:
an intermediate shielding body interposed between the paper shredder motor and the Hall effect detector, wherein electromagnetic interference to the Hall effect detector is reduced.

4. The paper shredder of claim 2, further comprising:
an annunciator,
wherein thickness of shreddant being comminuted exceeds a predetermined magnitude causing the shredder controller to create a perceptible indication of the exceeding a predetermined magnitude on the annunciator.

5. The paper shredder of claim 3 wherein the electromagnetic interference shielding comprises a ferrous material or a magnetic alloy or a conductive polymer.

* * * * *